(12) United States Patent
Matas et al.

(10) Patent No.: US 10,318,427 B2
(45) Date of Patent: Jun. 11, 2019

(54) RESOLVING MEMORY ACCESSES CROSSING CACHE LINE BOUNDARIES

(71) Applicant: Intel Corporation, Santa Clara, CA (US)

(72) Inventors: Ramon Matas, Portland, OR (US); Chung-Lun Chan, Hillsboro, OR (US); Alexey P. Suprun, Beaverton, OR (US); Aditya Kesiraju, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 14/575,525

(22) Filed: Dec. 18, 2014

(65) Prior Publication Data

US 2016/0179677 A1 Jun. 23, 2016

(51) Int. Cl.
*G06F 12/08* (2016.01)
*G06F 12/0855* (2016.01)
*G06F 12/0886* (2016.01)
*G06F 9/38* (2018.01)

(52) U.S. Cl.
CPC ........ *G06F 12/0855* (2013.01); *G06F 9/3816* (2013.01); *G06F 12/0886* (2013.01)

(58) Field of Classification Search
None
See application file for complete search history.

(56) References Cited

U.S. PATENT DOCUMENTS

| 8,024,522 B1* | 9/2011 | Favor | G06F 9/3004 |
| | | | 711/118 |
| 2009/0249033 A1* | 10/2009 | Greenhalgh | G06F 9/30149 |
| | | | 712/205 |
| 2010/0262781 A1* | 10/2010 | Hrusecky | G06F 9/30043 |
| | | | 711/119 |
| 2011/0047314 A1* | 2/2011 | Pogor | G06F 11/3648 |
| | | | 711/3 |
| 2014/0089598 A1* | 3/2014 | DeBruyne | G06F 9/30149 |
| | | | 711/140 |
| 2014/0281403 A1* | 9/2014 | Fox | G06F 9/3867 |
| | | | 712/214 |
| 2016/0110200 A1* | 4/2016 | Carlson | G06F 9/3836 |
| | | | 712/215 |

* cited by examiner

*Primary Examiner* — Ryan Bertram
*Assistant Examiner* — Trang K Ta
(74) *Attorney, Agent, or Firm* — Lowenstein Sandler LLP

(57) ABSTRACT

An instruction in a first cache line may be identified and an address associated with the instruction may be determined. The address may be determined to cross a cache line boundary associated with the first cache line and a second cache line. In response to determining that the address crosses the cache line boundary, the instruction may be adjusted based on a portion of the address included in the first cache line and a second instruction may be created based on a portion of the address included in the second cache line. The second instruction may be injected into an instruction pipeline after the adjusted instruction.

18 Claims, 12 Drawing Sheets

RESOLVING MEMORY ACCESSES CROSSING CACHE LINE BOUNDARIES

TECHNICAL FIELD

Embodiments described herein generally relate to memory accesses and, more specifically, relate to resolving memory accesses crossing cache line boundaries.

BACKGROUND

A processing device may be based on an architecture that includes a cache memory. A processor core of the processing device may store data in the cache memory. For example, instructions may access data stored in a data cache memory. The data cache memory may be used to more efficiently execute instructions associated with the processor core as opposed to executing instructions from a main memory.

DESCRIPTION OF EMBODIMENTS

Figure 1:
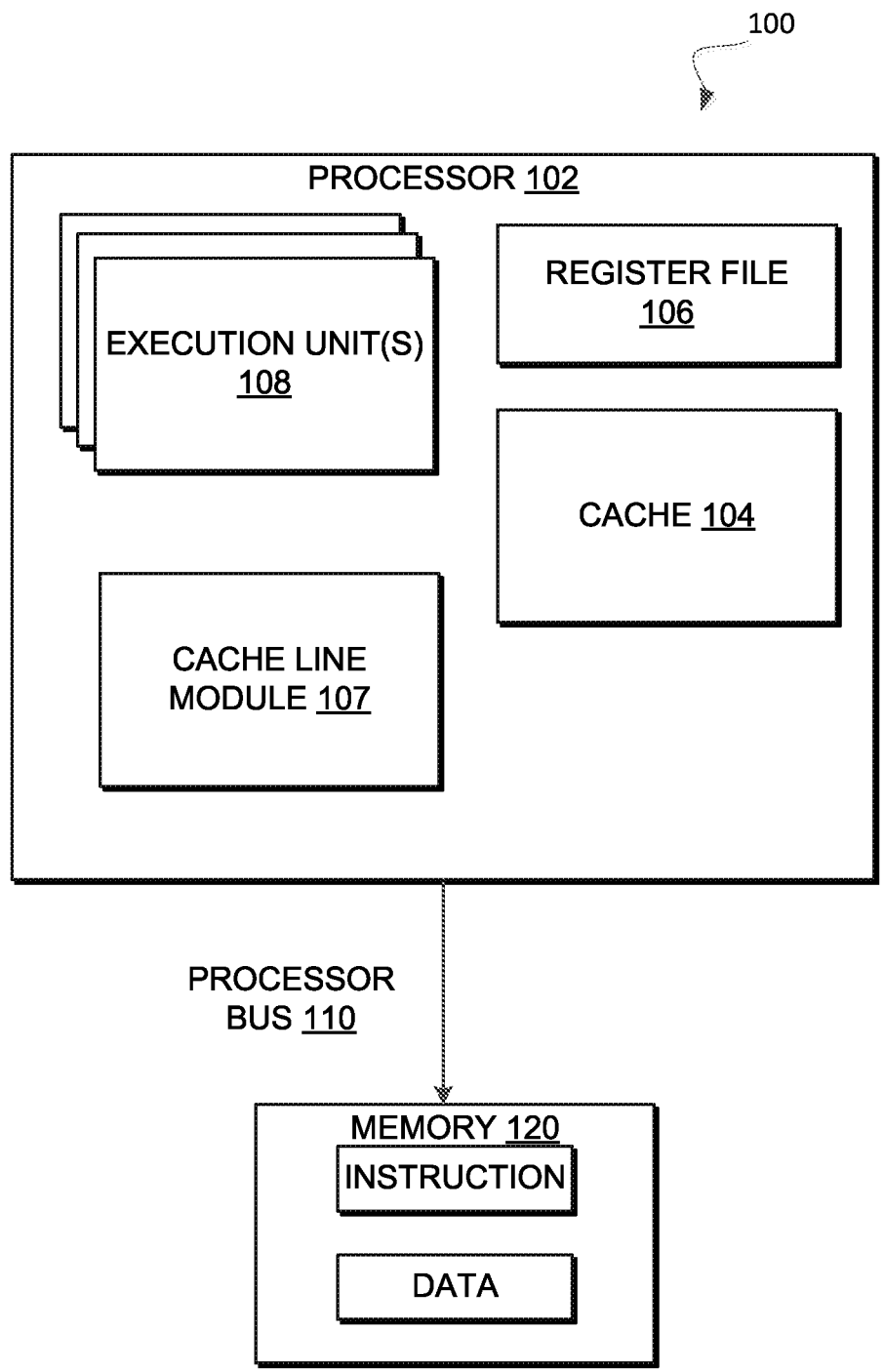
FIG. 1 is a block diagram illustrating a computing system that implements a cache line module to provide memory ordering or sequencing in accordance with some embodiments.

Aspects of the present disclosure are directed to a cache line boundary technology in a processing architecture. The cache line boundary technology may be used to improve the performance of a processor, processing device, or a processor-based system. For example, the cache line boundary technology may be used to improve the performance of a processing device by identifying when an address of an instruction crosses a cache line boundary from a first cache line to a second cache line, adjusts the instruction in the first cache line, and inserts or injects a second instruction corresponding to the address of the instruction included in the second cache line. An address of an instruction may refer to a memory location that a memory instruction targets or attempts to access (e.g., an address of data that is to be accessed by the memory instruction). A processing device may include a processor core, multiple functional units, and a memory. The processor core may offload a task to be performed by a functional unit. For example, the processor core may issue a first operation corresponding to storing or retrieving an instruction or command to a functional unit to perform a function or operation on data based on the instruction or command stored in the memory. In some embodiments, the instruction may access data stored in a data cache as further described below. The processing device may include a cache line module that includes function blocks that may be used to identify when an address of an instruction associated with one or more functional units crosses a cache line boundary based on the memory or data cache of the processing device.

Modern microprocessor-based products, including a System on a Chip (SoC), clients, servers, and hardware accelerators, may utilize a data cache to more efficiently execute instructions. A cache line module may identify when an address associated with an instruction crosses a cache line boundary between a first cache line and a second cache line. In some embodiments, an instruction may correspond to an operation to be performed on data stored at a particular address. The address of the instruction may be considered to cross the cache line boundary when a portion of the address is located in a first cache line and another portion of the same address for the instruction is located in a second cache line. Accordingly, the address is stored across two different cache lines. In some embodiments, data may be transferred between memory (e.g., a main memory) and a cache (e.g., a data cache) in blocks of a fixed size. Such blocks may be referred to as cache lines. Accordingly, the cache lines may correspond to copies of data (e.g., instructions) from the main memory to the data cache.

The cache line module may identify an instruction in an instruction pipeline that is associated with a data cache. The address of the instruction may also be identified and the cache line boundary module may determine if the address of the instruction crosses a cache line boundary from a first cache line to a second cache line (e.g., if a portion of the address is located in a first cache line and another portion of the address is located in the second cache line). If the address is determined to cross the cache line boundary, then the instruction may be adjusted to be based on the portion of the address located in the first cache line. For example, a length or size of the address for the instruction may be adjusted to only include the portion of the address located in the first cache line. Accordingly, the instruction is modified or adjusted. Furthermore, a second instruction may be created based on the other portion of the address located in the second cache line. For example, a length or size of the address of the second instruction may be the size of the portion of the address from the second cache line. Subsequently, the second instruction may be injected into the instruction pipeline at some point after the adjusted instruction. The adjusted instruction from the first cache line may then be combined with the second instruction.

Such cache line boundary technology may improve the overall performance of a processing device. For example, when an address of the instruction crosses the cache line boundary, the processing device may be required to perform two operations in order to execute the instruction. For example, in order to perform the instruction, the processing device may be required to read or retrieve a first cache line including the first portion of the address of the instruction as well as to read or retrieve a second cache line including the second portion of the address of the instruction. Such reading or retrieving of multiple cache lines for a single instruction may increase the amount of time to execute the instruction. Accordingly, by using the cache line module to identify when an address of an instruction crosses a cache line boundary and adjusting an instruction and injecting a second instruction based on the address crossing the cache line boundary, and then combining the adjusted instruction and the second instruction, the processing device may execute the instruction while retrieving or reading fewer cache lines. The use of the cache line boundary may further facilitate more efficient execution of vector instructions which may be associated with addresses of a larger size than other instructions. A vector instruction may refer to an instruction that comprises a one dimensional array of data (e.g., an instruction and an address associated with the instruction) and/or a multi-dimensional arrays of data. Since the vector instructions may be associated with a larger address (e.g., a larger memory access), then the likelihood of the address of the vector instruction crossing a cache line boundary increases. Accordingly, identifying when the address of the vector instruction crosses the cache line boundary may optimize the performance of a processing device using vector instructions by reducing bandwidth consumption and memory access latency.

FIG. 1 is a block diagram illustrating a computing system 100 that implements a cache line module 107 for identifying when an address of an instruction crosses a cache line boundary in accordance with some embodiments. The computing system 100 is formed with a processor 102 that includes one or more execution units 108 to execute an instruction (e.g., store or load instruction) in accordance with one or more embodiments as described herein. In short, the cache line module 107 is used by the processor 102 to identify a crossing of a cache line boundary associated with an instruction obtained via memory accesses to the main memory 120 that stores a copy of the instruction into the cache memory 104 via one or more memory channels. The cache line module 107 may then identify an instruction in the cache memory 104 (e.g., a data cache) and identify if an address associated with the instruction crosses a cache line boundary. Additional details with regard to a cache line module 107 are described in more detail below with respect to FIGS. 2-6.

Computing system 100 includes a component, such as a processor 102, to employ execution units 108 including logic to perform algorithms for processing data in accordance with the embodiments described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes, and the like) may also be used. In one embodiment, sample computing system 100 executes a version of the WINDOWS™ operating system available from Microsoft Corporation of Redmond, Wash., although other operating systems (e.g., UNIX and Linux), embedded software, and/or graphical user interfaces may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Examples of handheld devices include, but are not limited to, cellular phones, Internet Protocol devices, digital cameras, personal digital assistants (PDAs), and handheld PCs. Embedded applications may include, but are not limited to, a micro controller, a digital signal processor (DSP), system on a chip (SoC), network computers (NetPC), set-top boxes, network hubs, wide area network (WAN) switches, or any other system that can perform one or more instructions in accordance with at least one embodiment.

In the illustrated embodiment of FIG. 1, processor 102 includes one or more execution units 108 to implement an algorithm that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, an out of order based processor, or any other processor device, such as a digital signal processor, for example. The processor 102 is coupled to a processor bus 110 that transmits data signals between the processor 102 and other components in the system 100, such as main memory 120 storing instruction, data, or any combination thereof. The other components of the system 100 may include, but are not limited to, a graphics accelerator, a memory controller hub, an I/O controller hub, a wireless transceiver, a Flash BIOS, a network controller, an audio controller, a serial expansion port, and an I/O controller. These elements perform their conventional functions that are well known to those familiar with the art.

In one embodiment, the processor 102 includes a Level 1 (L1) internal cache memory 104. Depending on the architecture, the processor 102 may have a single internal cache memory or multiple levels of internal cache memories (e.g., L1 and L2). For example, the processor 102 may include an instruction cache (e.g., an L1 instruction cache) and a data cache (e.g. an L1 data cache) as part of its L1 internal cache memory. Other embodiments include a combination of both internal and external caches depending on the particular implementation and needs. Register file 106 is to store different types of data in various registers including, but not limited to, integer registers, floating point registers, vector registers, banked registers, shadow registers, checkpoint registers, status registers, configuration registers, and instruction pointer registers.

Execution unit 108, including logic to perform integer and floating point operations, also resides in the processor 102. It should be noted that the execution unit may or may not have a floating point unit. The processor 102, in one embodiment, includes a microcode (μcode) ROM to store microcode, which when executed, is to perform algorithms for certain macroinstructions or handle complex scenarios. Here, microcode is potentially updateable to handle logic bugs/fixes for processor 102. Alternative embodiments of an execution unit 108 may also be used in micro controllers, embedded processors, graphics devices, DSPs, and other types of logic circuits.

System 100 includes a main memory 120. Main memory 120 may include, but is not limited to, a dynamic random access memory (DRAM) device, a static random access memory (SRAM) device, flash memory device, or other memory device. Main memory 120 stores instructions and/or data represented by data signals that are to be executed by the processor 102. The processor 102 is coupled to the main memory 120 via a processor bus 110. A system logic chip, such as a memory controller hub (MCH) may be coupled to the processor bus 110 and main memory 120. An MCH can provide a high bandwidth memory path to memory 120 for instruction and data storage and for storage of graphics commands, data and textures. The MCH can be used to direct data signals between the processor 102, main memory 120, and other components in the system 100 and to bridge the data signals between processor bus 110, main memory 120, cache memory 104, and system I/O, for example. The MCH may be coupled to main memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the main memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the cache line module 107 may be used with a system on a chip. The memory for one such system may be a flash memory. The flash memory may be located on the same die as the processor and other system components. Additionally, other logic blocks, such as a memory controller or graphics controller, may also be located on a system on a chip.

Figure 2:
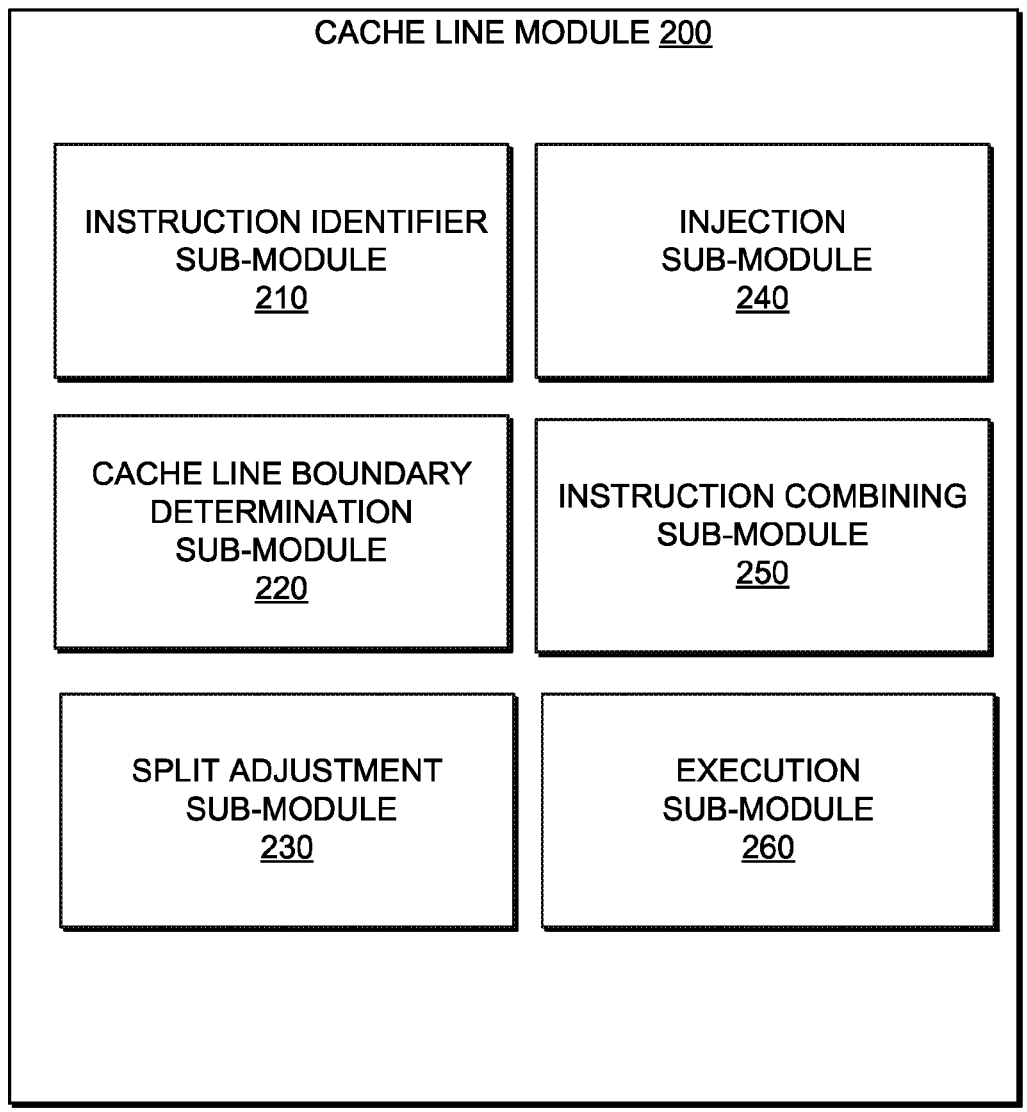
FIG. 2 is a block diagram illustrating a cache line module in accordance with some embodiments of the disclosure.

FIG. 2 is a block diagram illustrating an example cache line module 200 in accordance with some embodiments of the disclosure. The cache line module 200 may correspond to the cache line module 107 of FIG. 1. In general, the cache line module 200 may include an instruction identifier sub-module (or function block) 210, a cache line boundary determination sub-module (or function block) 220, a split adjustment sub-module (or function block) 230, an injection sub-module (or function block) 240, an instruction combining sub-module (or function block) 250, and an execution sub-module (or function block) 260. In alternative embodiments, the functionality of one or more of the sub-modules may be combined or divided. For example, a single sub-module may perform the functionality of the instruction identifier sub-module 210, cache line boundary determination sub-module 220, split adjustment sub-module 230, injection module sub-module 240, instruction combining sub-module 250, and the execution sub-module 260. Alternatively, the functionality of each of the sub-modules 210, 220, 230, 240, 250, and 260 may be separated between multiple sub-modules.

As shown in FIG. 2, the cache line module 200 may include an instruction identifier sub-module 210. In some embodiments, the instruction identifier sub-module 210 may identify an instruction. For example, the instruction may be identified as an instruction that is to be executed. In some embodiments, the instruction may be identified at address generation time. The instruction may be identified as being part of a cache line that has been retrieved from a data cache. The cache line boundary determination sub-module 220 may identify an address associated with the identified instruction and may determine if the address associated with the instruction crosses a cache line boundary. For example, the cache line boundary determination sub-module 220 may identify an address for which the instruction is to operate and may identify if the address crosses the cache line boundary from a first cache line to a second cache line (e.g., portions of the address of the instruction are located in two separate cache lines). The split adjustment module 230 may adjust or modify the instruction based on the portions of the address that are included in the first cache line. In some embodiments, the adjusting of the instruction may involve the shortening or changing of the instruction to include the portion of the address that is located in the first cache line. The injection sub-module 240 may create a second instruction based on the portion of the address that is included in the second cache line. For example, a second instruction associated with the same operation as the identified instruction may be created based on the portion of the address in the second cache line. Furthermore, the instruction combining sub-module 250 may combine the adjusted or modified instruction with the second instruction. Additionally, the execution sub-module 260 may execute the combined instruction that includes the adjusted or modified instruction and the second instruction.

As an example, an instruction that is going to be executed may be identified. An address associated with an operation of the instruction may be subsequently identified. The cache line module may determine if the address crosses the cache line boundary from a first cache line to a second cache line. For example, the address associated with the instruction may be four bytes in size. The first three bytes of the instruction may be included in the first cache line and the fourth byte of the instruction may be included in the second cache line. Accordingly, the address of the instruction may be considered to cross a cache line boundary. In response to such a determination, the instruction may be adjusted or modified based on the size of the bytes of the address that are included in the first cache line. For example, the instruction may be modified to operate on the address of the three bytes that are included in the first cache line. Furthermore, a second instruction may be created based on the size of the portion of the address in the second cache line. For example, the second instruction may be sized to operate on one byte of the address that is included in the second cache line. In some embodiments, the modifying of the instruction in the first cache line may also include an identification (e.g., a bit or other such data value) that the modified instruction is a split instruction (e.g., an instruction that was split due to the address crossing the cache line boundary). Furthermore, the creation of the second instruction may also include an identification that the second instruction is also a split instruction. In some embodiments, the modified instruction may be directed to a first path comprising one more staging elements associated with an instruction pipeline, as described in further detail below, and the second instruction may be inserted or injected into the instruction pipeline based on the number of the staging elements associated with the instruction pipeline. Furthermore, the modified instruction and the second instruction may subsequently be combined and executed.

Figure 3:
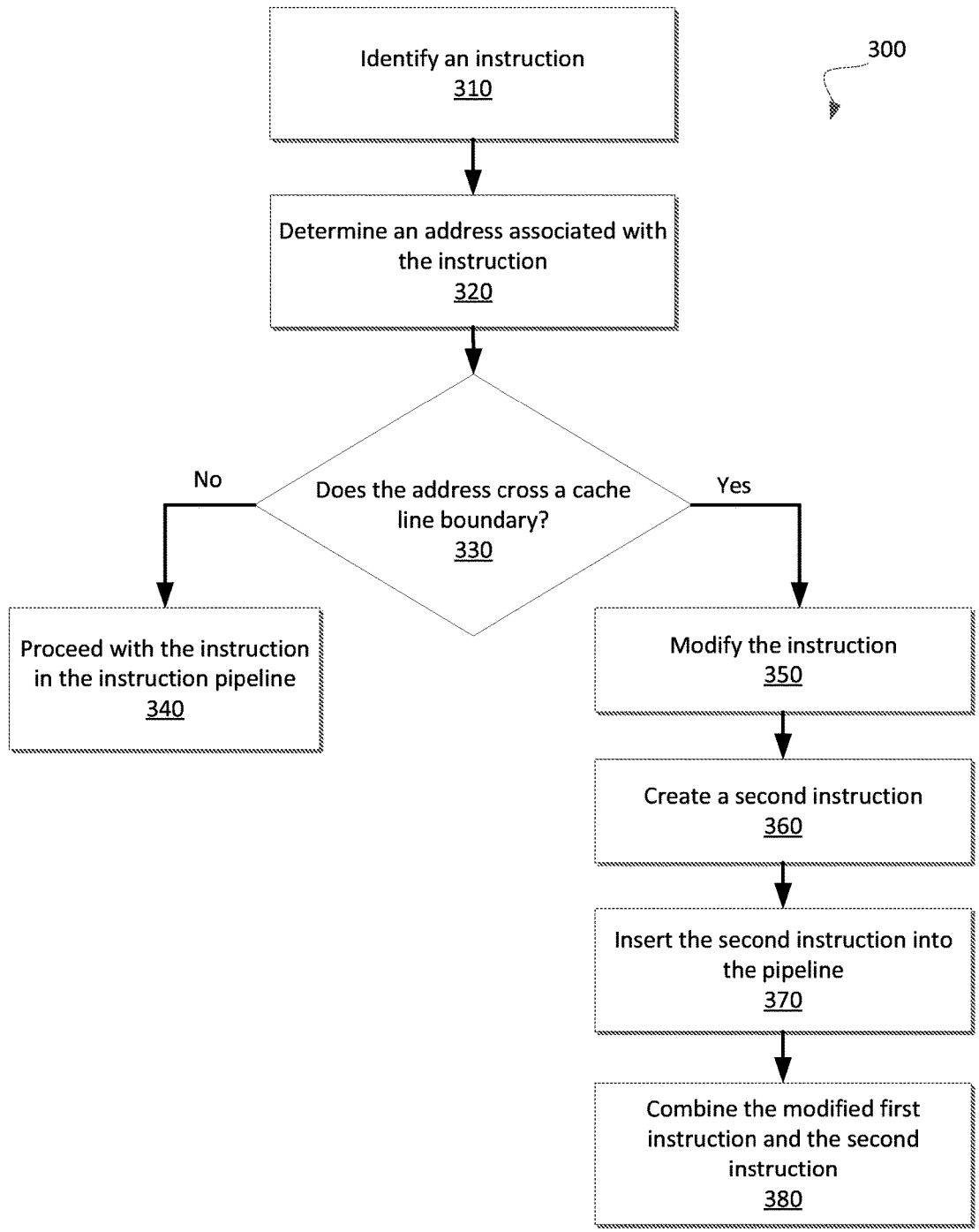
FIG. 3 is a flow diagram of a method to resolve a memory access associated with an instruction that crosses a cache line boundary in accordance with some embodiments.

FIG. 3 is a flow diagram of a method 300 to resolve a memory access associated with an instruction that crosses a cache line boundary in accordance with some embodiments. In some embodiments, the method 300 may be performed by the cache line module 107 or 200. For example, the method 300 may be used by the cache line module 107 of FIG. 1 or the cache line module 200 of FIG. 2 to control, modify, and/or insert instructions of a processor (e.g., processor 102) for an instruction pipeline. The method 300 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 300.

As shown in FIG. 3, the method 300 may begin with the processing logic identifying, at block 310, an instruction. In some embodiments, the instruction may be an instruction that is to be executed in an instruction pipeline. Furthermore, the instruction may be identified from a first cache line. The instruction may be based on an operation and an address. For example, the instruction may specify a particular operation that is to be performed on an address corresponding to one or more registers. The operation may include, but is not limited, to a load operation or a store operation. In some embodiments, a load operation may specify to copy data from memory at the identified address into a register and the store operation may specify to copy data from a register to memory at the identified address. The processing logic may determine an address associated with the instruction (block 320). For example, the processing logic may identify the address associated with an operation to be performed by the instruction. The processing logic may further determine if the address associated with the instruction crosses a cache line boundary (block 330). For example, if the address associated with the instruction is included in both the first cache line and a second cache line, then the address of the instruction may be considered to cross a cache line boundary between the first cache line and the second cache line. Accordingly, the processing logic may identify when the address associated with the instruction is included in multiple cache lines of a data cache.

Referring to FIG. 3, if the address associated with the instruction does not cross the cache line boundary between the first cache line and the second cache line, then the processing logic may proceed with the instruction (block 340). For example, the instruction may proceed through the instruction pipeline. However, if the address associated with the instruction does cross the cache line boundary between the first cache line and the second cache line, then the processing logic may modify the instruction (block 350). For example, the instruction may be modified to be a different size or length. For example, the length of the instruction may be modified to match the portion of the address associated with the instruction that is included in the first cache line. Thus, the instruction may be modified from an instruction of a first size (e.g., four bytes) to an instruction of a second size (e.g., three bytes) where the first size is larger than the second size. Furthermore, a status indicator or other such data may be included as information to identify that the instruction has been modified based on a portion of the address that is in the first cache line. The processing logic may further create a second instruction (block 360). For example, after the modifying of the instruction in the first cache line, a second instruction may be created based on the portion of the address that is included in the second cache line. In some embodiments, the length of the second instruction may be based on the portion of the address included in the second cache line. For example, if three out of four bytes of the address associated with an instruction are included in the first cache line and one out of the four bytes is included in the second cache line, then the second cache line may be created to be a length or size of one.

As shown in FIG. 3, the processing logic may inject or insert the second instruction into the instruction pipeline (block 370). In some embodiments, the second instruction may be injected into the pipeline based on one or more staging elements (e.g., staging flip flops or registers) that may be used to store the modified instruction. For example, each staging element may transmit an input signal as an output signal for each clock cycle associated with the instruction pipeline. For example, if two staging elements are used to store the modified instruction in the instruction pipeline, then a first staging element may be used to output the modified instruction to a second staging element and the second clock cycle may result in the second staging element outputting the modified instruction. Accordingly, the modified instruction may be stored in the instruction pipeline based on a number of staging elements that correspond to a number of clock cycles for the final staging element to output the modified instruction. Further details with regard to such a configuration of staging elements are described in conjunction with FIG. 6. The second instruction may be injected or inserted into the instruction pipeline based on the number of staging elements. For example, if two staging elements are used so that the modified instruction is outputted after two clock cycles, then the second instruction may be inserted or injected into the pipeline after the two clock cycles. Furthermore, the processing logic may combine the modified instruction and the second instruction (block 380). In some embodiments, the combined instruction may then be executed. Furthermore, the combined instruction may be associated with the address on a single cache line.

Figure 4:
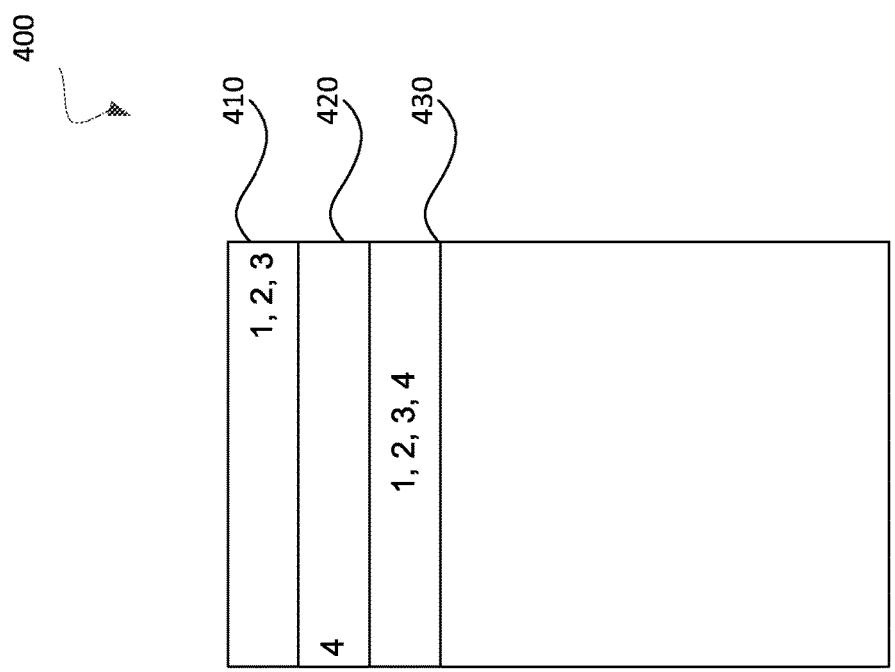
FIG. 4 illustrates an example instruction associated with an address that crosses a cache line boundary and an instruction associated with an address that does not cross a cache line boundary in accordance with some embodiments.

FIG. 4 illustrates an example instruction associated with an address that crosses a cache line boundary and an instruction associated with an address that does not cross a cache line boundary in accordance with some embodiments. In general, the cache lines of FIG. 4 may correspond to cache lines as described in relation to the cache line module 107 or 200 of FIGS. 1 and 2.

As shown in FIG. 4, the first cache line 410 may include three out of four bytes of an address associated with an instruction. The second cache line 420 may include one out of the four bytes of the same address associated with the same instruction. Accordingly, the address may be considered to cross a cache line boundary between the first cache line 410 and the second cache line 420. However, the third cache line 430 may include all four bytes of an address associate with a second instruction. Accordingly, the second instruction may not be considered to cross a cache line boundary as the entire address associated with the second instruction is included in a single cache line (e.g., the third cache line 430).

Figure 5:
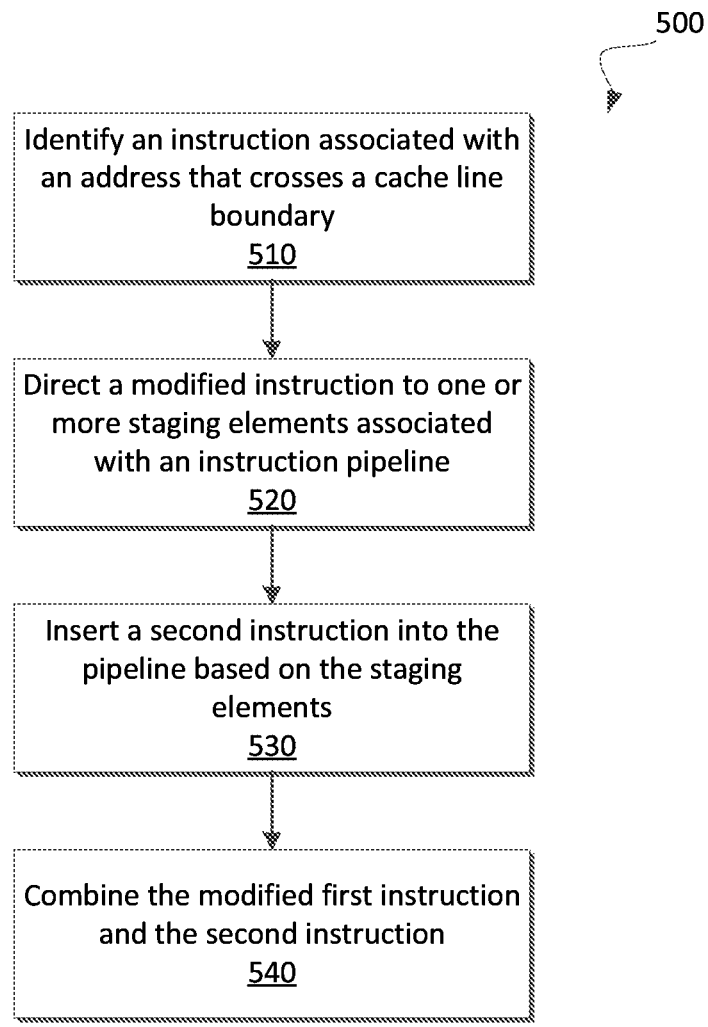
FIG. 5 illustrates a method to combine a modified instruction with a second instruction in accordance with some embodiments of the disclosure.

FIG. 5 illustrates a method 500 to combine a modified instruction with a second instruction in accordance with some embodiments of the disclosure. In some embodiments, the method 500 may be performed by the cache line module 107 or 200. For example, the method 500 may be used by the cache line module 107 of FIG. 1 or the cache line module 200 of FIG. 2 to combine instructions of a processor (e.g., processor 102) for an instruction pipeline where the instructions are associated with an address crossing a cache line boundary. The method 500 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 300.

As shown in FIG. 5, the method 500 may begin with the processing logic identifying an instruction associated with an address that crosses a cache line boundary (block 510). For example, an instruction with an address that has a first portion of the address included in a first cache line and a second portion of the same address for the same instruction in a second cache line may be detected. The processing logic may direct a modified instruction to one or more staging elements associated with an instruction pipeline (block 520). For example, the identified instruction may be modified based on a length of the portion of the address included in the first cache line. The modified instruction may be directed to a first path of the instruction pipeline that includes one or more staging elements. In some embodiments, the staging elements may be flip-flops or other such memory elements. The processing logic may further insert a second instruction into the instruction pipeline (block 530). For example, a second insertion with a length based on the second portion of the address in the second cache line may be inserted into the instruction pipeline based on the number of the staging elements. In some embodiments, the second instruction may be inserted into a second path of the instruction pipeline that does not include the one or more staging elements. In the same or alternative embodiments, the second instruction may be inserted into the pipeline based on the number of the staging elements in the first path. For example, if the first path includes two staging elements (e.g., two sets of flip-flops), then the second instruction may be inserted into the instruction pipeline after two clock cycles of the processing logic. Furthermore, the processing logic may combine the modified instruction and the second instruction based on the one or more staging elements (block 540).

Figure 6:
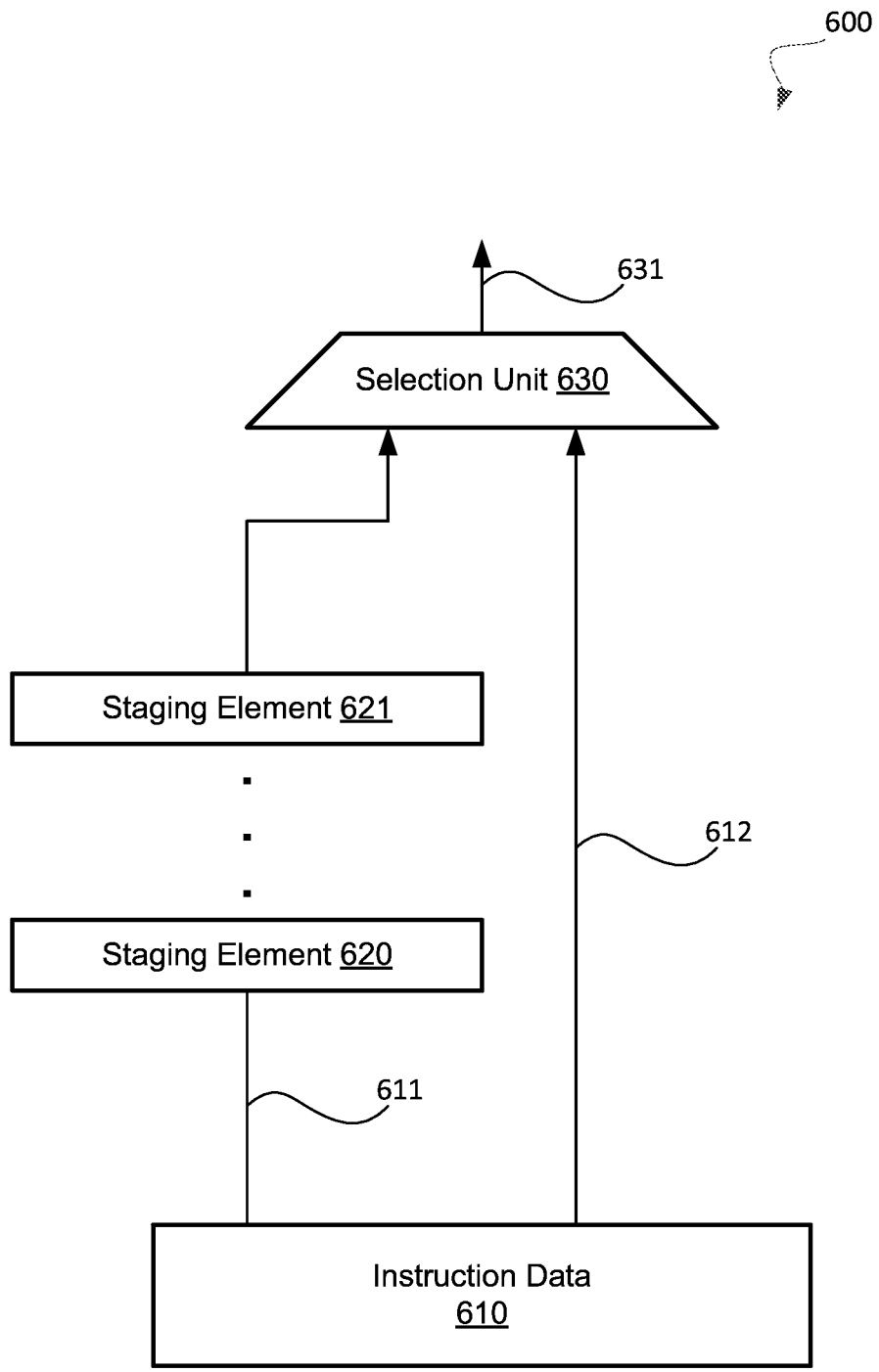
FIG. 6 illustrates an example architecture to combine a modified instruction and a second instruction in accordance with some embodiments of the disclosure.

FIG. 6 illustrates an example architecture 600 to combine a modified instruction and a second instruction in accordance with some embodiments of the disclosure. In general, the architecture 600 may be implemented in a processing device or processor core. For example, the architecture 600 may be used by a cache line module 107 or 200 of FIG. 1 or 2. In some embodiments, the architecture 600 may be associated with an instruction pipeline.

As shown in FIG. 6, the architecture 600 may receive instruction data 610. In some embodiments, the instruction data 610 may include multiple instructions. The architecture 600 may further include a first path that includes staging elements 620 and 621. Although two staging elements are shown, any number of staging elements may be used in the architecture 600. In some embodiments, the staging elements may receive an instruction that has been modified when the instruction is associated with an address that crosses a cache line boundary. For example, the modified instructions may be directed to or progress through a first path 611 in the architecture 600. As shown, the first path 611 may include one or more staging elements 620 and 621. The staging elements 620 and 621 may operate to store an input and to output the stored input after a clock cycle. For example, the modified instruction may be stored in the staging element 620. After a first clock cycle associated with the architecture 600, the staging element 620 may output the stored modified instruction to the staging element 621. Accordingly, the modified instruction may be stored at the staging element 621 after the first clock cycle. After a second clock cycle, the modified instruction stored at the staging element 621 may then be outputted to the selection unit 630. In some embodiments, the selection unit may select the modified instruction to be combined with a second instruction as previously described. For example, in some embodiments, the second instruction and/or other instructions associated with addresses that do not cross a cache line boundaries may be directed to the selection unit 630 via the second path 612. In some embodiments, when the selection unit 630 receives the second instruction, the selection unit 630 may identify (e.g., through an identification bit of the second instruction) that the second instruction is associated with an instruction with an address that crosses a cache line boundary. Accordingly, the selection unit 630 may select the modified instruction from the staging element 621 in the first path 611 to be combined with the second instruction from the second path 612.

Figure 7:
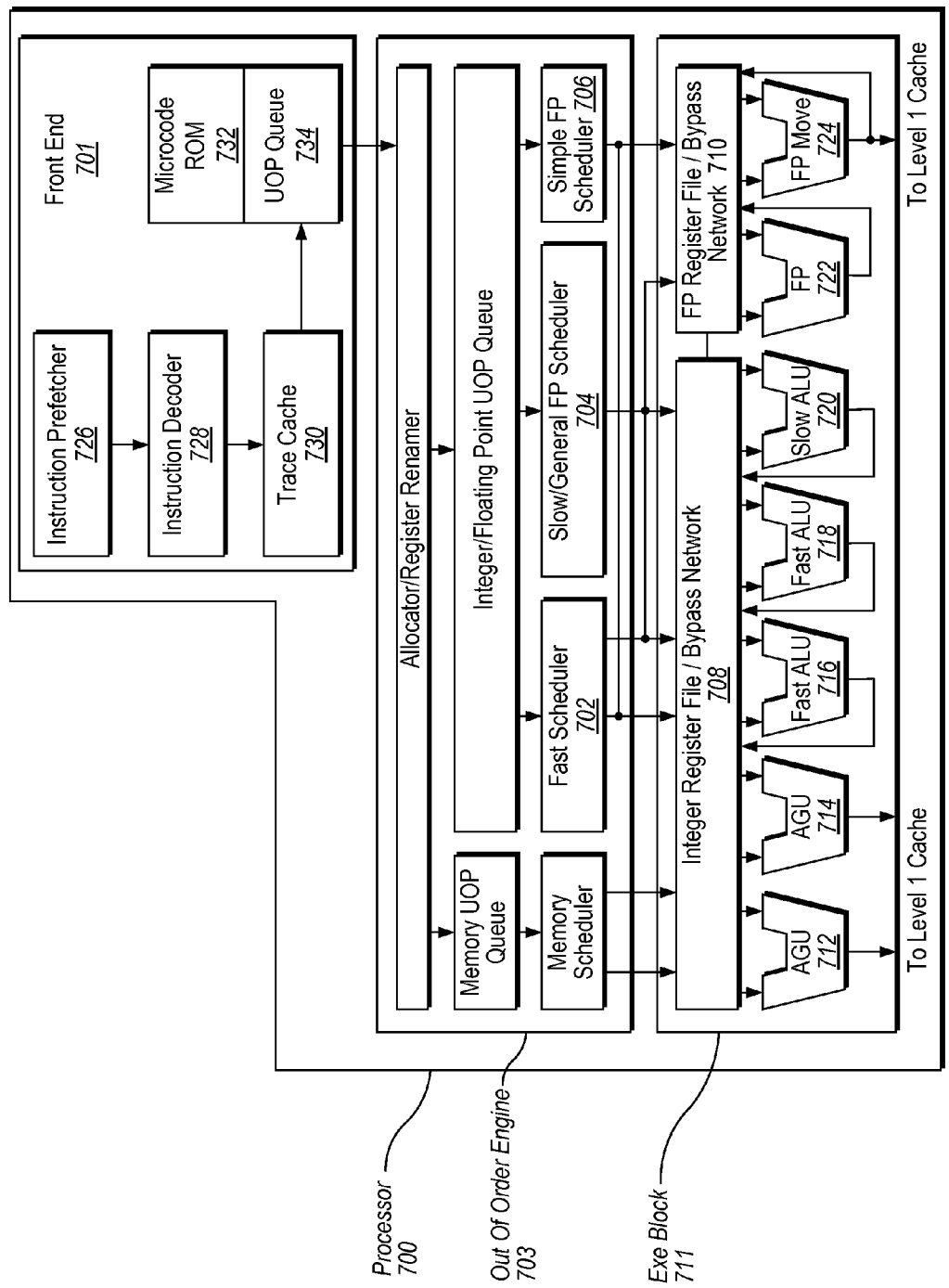
FIG. 7 illustrates a block diagram of the micro-architecture for a processor that includes logic circuits to resolve instructions associated with memory accesses that cross a cache line boundary according to one embodiment.

FIG. 7 illustrates a block diagram of the micro-architecture for a processor 700 that includes logic circuits to manage memory sequences according to one embodiment. The cache line module 107 and 200 may be implemented in the processor 700. In some embodiments, an instruction in accordance with one embodiment can be implemented to operate on data elements having sizes of byte, word, double-word, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution. In some embodiments, the out-of-order execution engine 703 and the exe block 711 may notify a retirement unit with regard to the allocation and completion/execution of an instruction.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to manage checkpoints of an out of order architecture according to one embodiment. In one embodiment, the execution block 711 of processor 700 may include the checkpoint module 200, to manage checkpoints of an out of order architecture according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
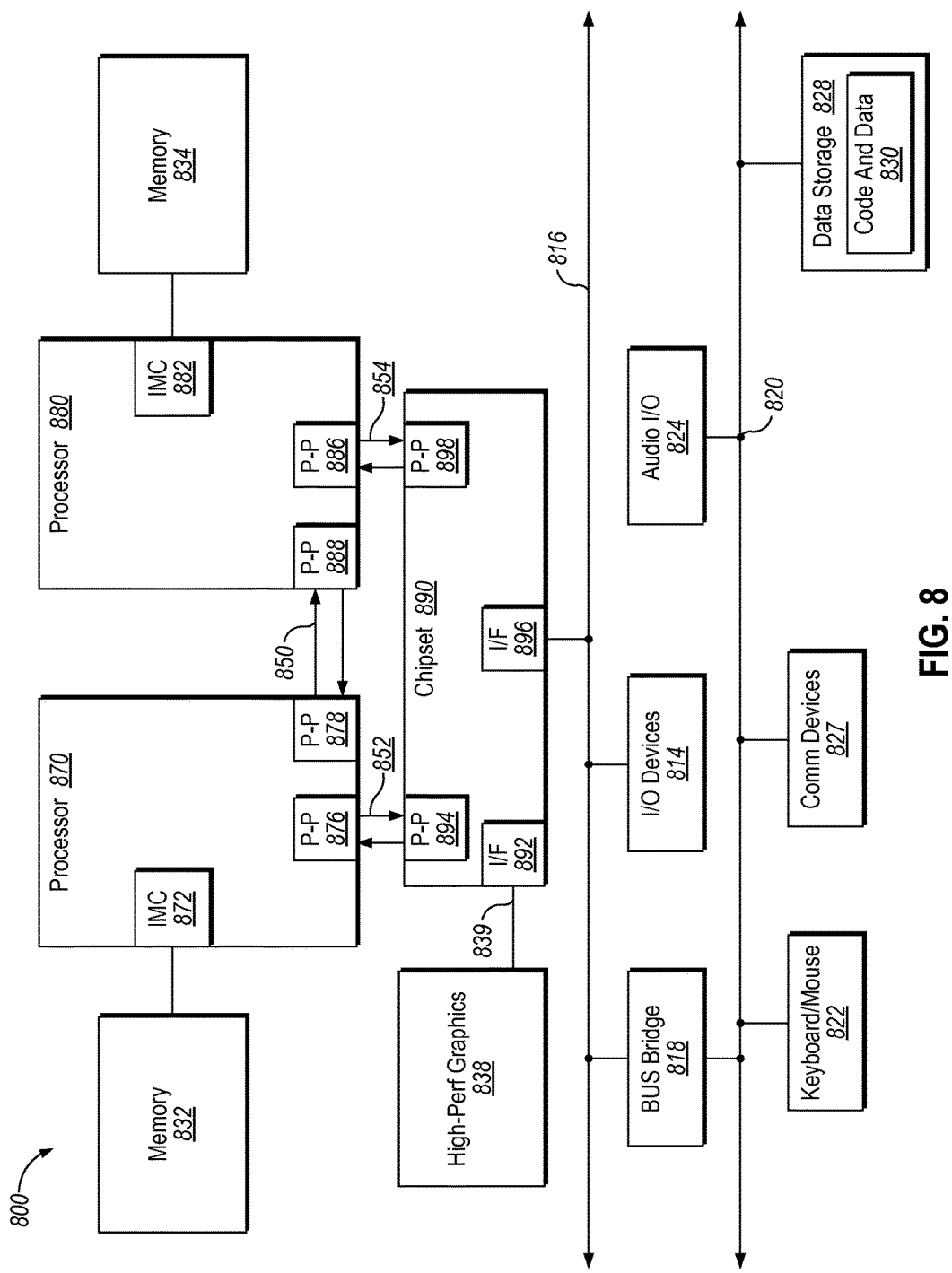
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores, although potentially many more cores may be present in the processors. The processors each may include hybrid write mode logics in accordance with an embodiment of the present. In some embodiments, the cache line modules 107 and 200 may be implemented in the multiprocessor system 800. For example, the cache line modules 107 and 200 may be implemented in the processor 870 and/or the processor 880.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
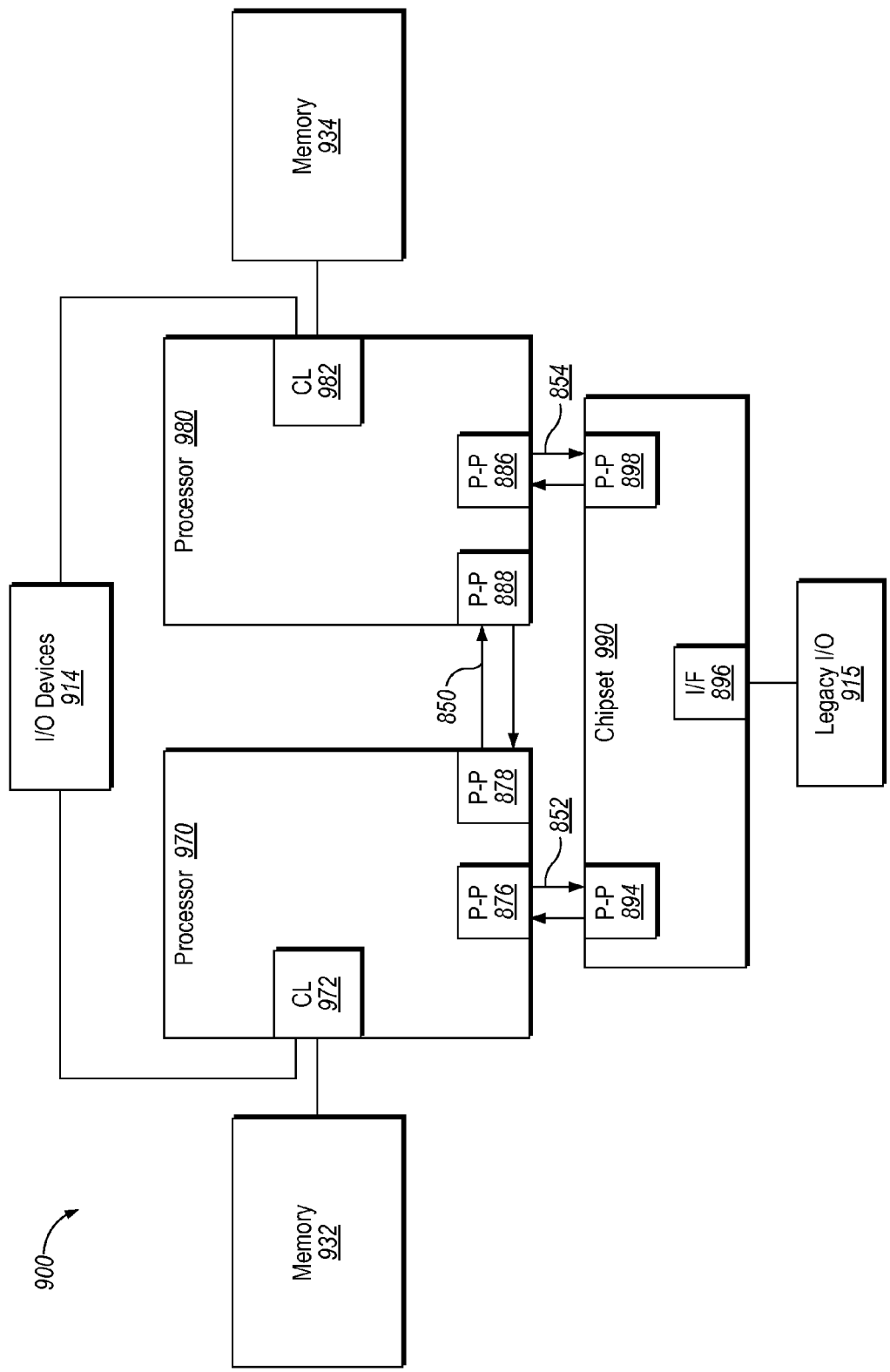
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 915 are also coupled to the control logic 972, 982. Legacy I/O devices 915 are coupled to the chipset 990. In some embodiments, the cache line modules 107 and 200 may be implemented in the system 900. For example, the cache line modules 107 and 200 may be implemented in the processor 970 and/or the processor 980.

Figure 10:
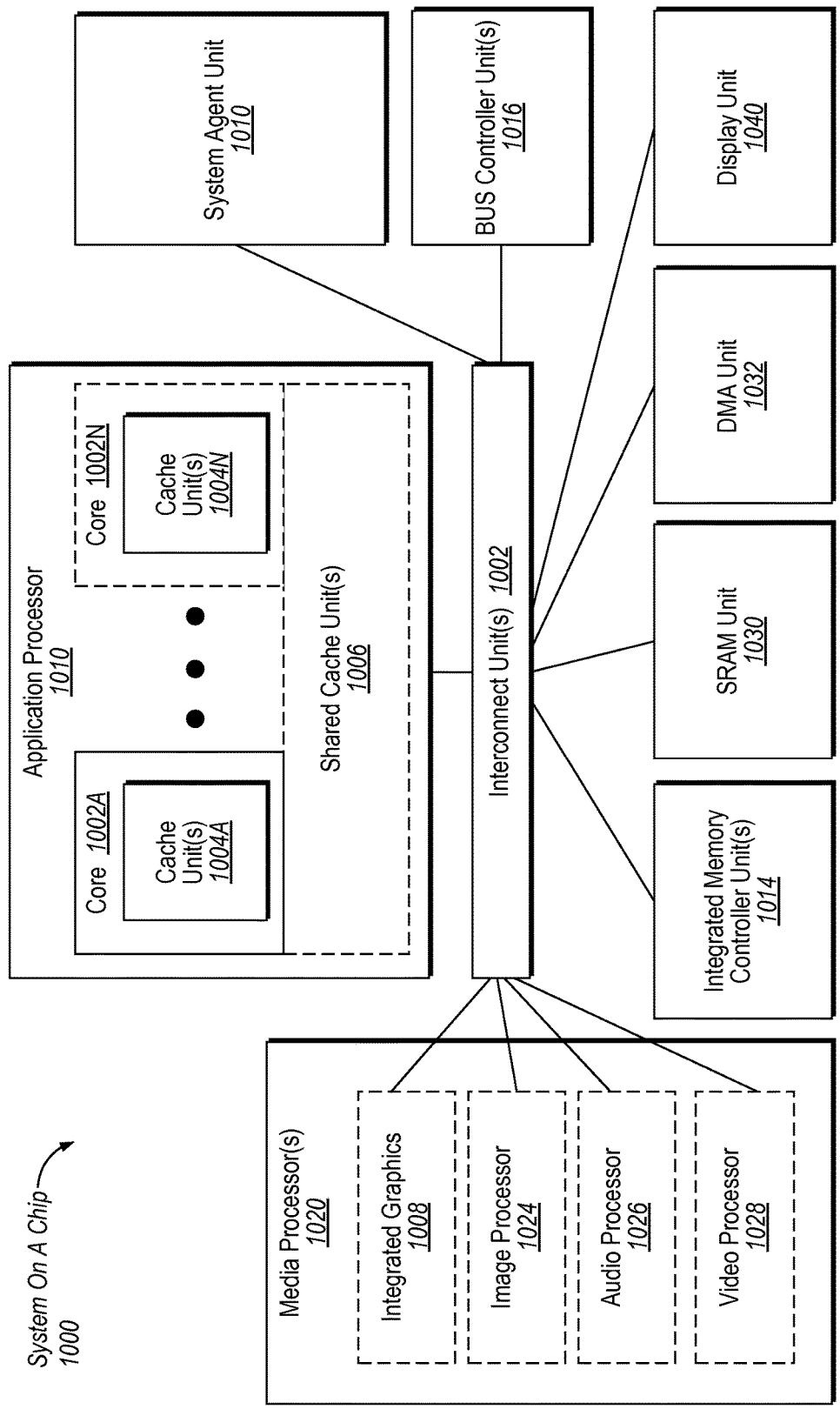
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 10 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. In some embodiments, the cache line modules 107 and 200 may be implemented in the SoC 1000. For example, the cache line modules 107 and 200 may be implemented in the application processor 1010 and/or cores 1002A-N.

Figure 11:
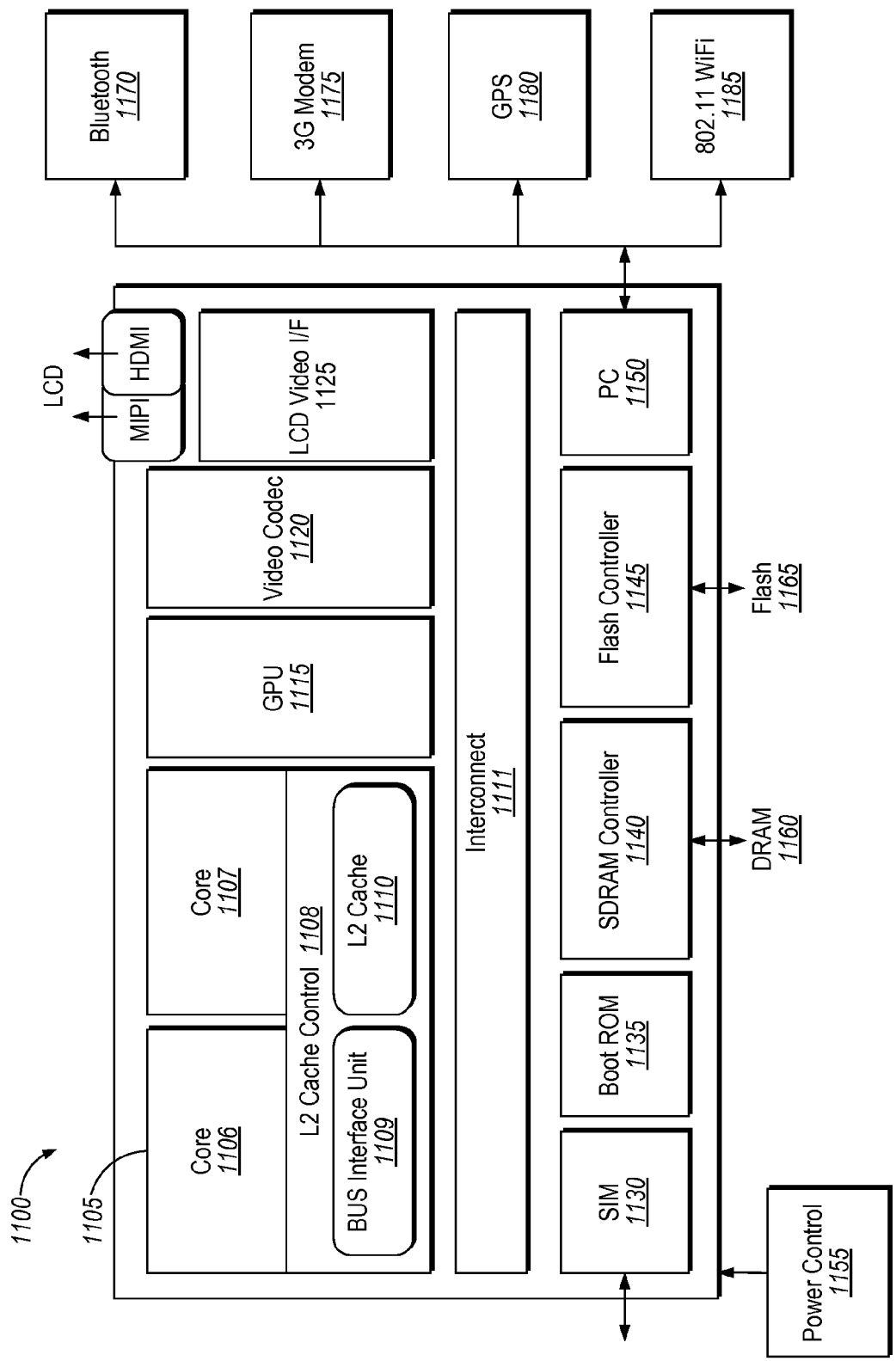
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. In some embodiments, the cache line modules 107 and 200 may be implemented in the SCC 1100. For example, the cache line modules 107 and 200 may be implemented in the core 1106 and/or core 1107.

Here, SOC 1100 includes two cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
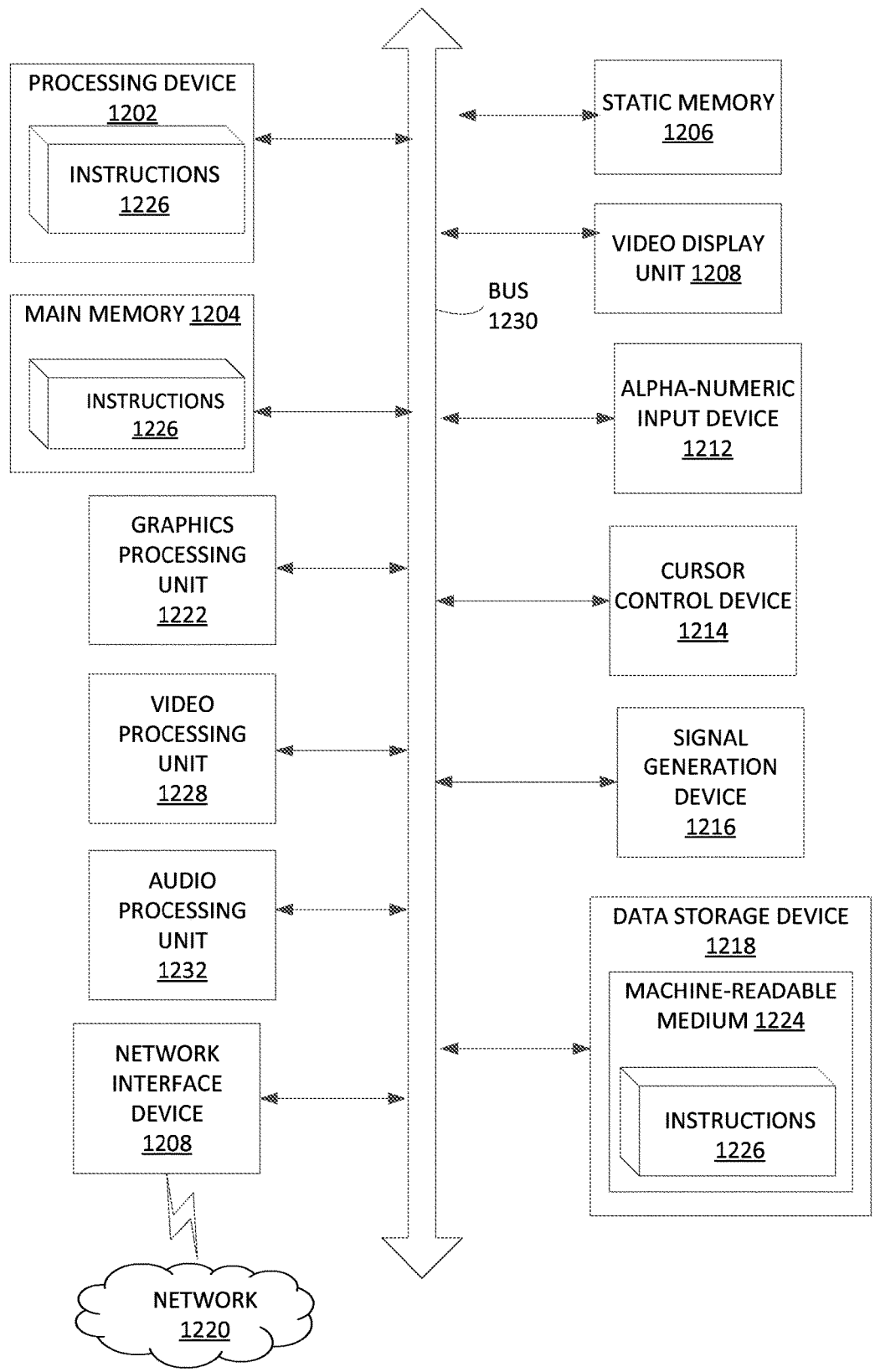
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230. In some embodiments, the cache line modules 107 and 200 may be implemented in the system 1200. For example, the cache line modules 107 and 200 may be implemented in the processing device 1202 and/or be stored in the instructions 1226.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1.

Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising a memory, one or more functional units coupled to the memory, and a cache line module coupled to the memory and the one or more functional units and to identify an instruction in a first cache line, determine an address associated with the instruction, determine that the address associated with the instruction crosses a cache line boundary associated with the first cache line and a second cache line, in response to determining that the address crosses the cache line boundary, adjust the instruction based on a portion of the address included in the first cache line and create a second instruction based on a portion of the address included in the second cache line, and inject the second instruction into an instruction pipeline after the adjusted instruction.

In Example 2, in the processor of Example 1, the cache line module is further to combine the adjusted instruction in the first cache line with the second instruction and execute the combined adjusted instruction and second instruction.

In Example 3, in the processor of any of Examples 1-2, the adjusted instruction is directed to a first path of the instruction pipeline comprising one or more staging elements, and wherein the second instruction is injected into a second path of the instruction pipeline that does not comprise the one or more staging elements.

In Example 4, in the processor of any of Examples 1-3, the one or more staging elements comprise flip-flops.

In Example 5, in the processor of any of Examples 1-4, the second instruction is injected into the second path of the instruction pipeline based on a number of the one or more staging elements.

In Example 6, in the processor of any of Examples 1-5, the injecting of the second instruction into the second path of the instruction pipeline based on the number of the one or more staging elements comprises injecting the second instruction after a number of cycles that correspond to the number of the one or more staging elements.

In Example 7, in the processor of any of Examples 1-6, the adjusting of the instruction based on the portion of the address included in the first cache line comprises changing a length of the instruction identified in the first cache line to a length based on the portion of the address included in the first cache line.

In Example 8, in the processor of any of Examples 1-7, the creating of the second instruction comprises creating an instruction with a length based on the portion of the address included in the second cache line.

In Example 9, in the processor of any of Examples 1-8, the determining that the address associated with the instruction crosses the cache line boundary associated with the first cache line and the second cache line comprises identifying that a portion of the address is in the first cache line and another portion of the address is in the second cache line.

Example 10 is a method comprising determining, by a cache line module of a processor, that an address associated with an instruction crosses a cache line boundary associated with a first cache line and a second cache line, in response to determining that the address crosses the cache line boundary, adjusting, by the cache line module, the instruction based on a portion of the address included in the first cache line and create a second instruction based on a portion of the address included in the second cache line, and injecting, by the cache line module, the second instruction into an instruction pipeline after the adjusted instruction.

In Example 11, in the method of Example 10, the method further comprises combining, by the cache line module, the adjusted instruction in the first cache line with the second instruction; and executing, by the cache line module, the combined adjusted instruction and second instruction.

In Example 12, in the method of any of Examples 10-11, the adjusted instruction is directed to a first path of the instruction pipeline comprising one or more staging elements, and wherein the second instruction is injected into a second path of the instruction pipeline that does not comprise the one or more staging elements.

In Example 13, in the method of any of Examples 10-12, the one or more staging elements comprise flip-flops.

In Example 14, in the method of any of Examples 10-13, the second instruction is injected into the second path of the instruction pipeline based on a number of the one or more staging elements.

In Example 15, in the method of any of Examples 10-14, the injecting of the second instruction into the second path of the instruction pipeline based on the number of the one or more staging elements comprises injecting the second instruction after a number of cycles that correspond to the number of the one or more staging elements.

In Example 16, in the method of any of Examples 10-15, the adjusting of the instruction based on the portion of the address included in the first cache line comprises changing a length of the instruction identified in the first cache line to a length based on the portion of the address included in the first cache line.

In Example 17, in the method of any of Examples 10-16, the creating of the second instruction comprises creating an instruction with a length based on the portion of the address included in the second cache line.

In Example 18, in the method of any of Examples 10-17 the determining that the address associated with the instruction crosses the cache line boundary associated with the first cache line and the second cache line comprises identifying that a portion of the address is in the first cache line and another portion of the address is in the second cache line.

Example 19 is an integrated circuit comprising a processor core and a cache line module associated with the processor core. The cache line module is to identify an address associated with an instruction in a first cache line, determine that the address associated with the instruction crosses a cache line boundary between the first cache line and a second cache line, in response to determining that the address crosses the cache line boundary, adjust the instruction based on a portion of the address included in the first cache line and create a second instruction based on a portion of the address included in the second cache line, and inject the second instruction into an instruction pipeline after the adjusted instruction.

In Example 20, in the integrated circuit of Example 19, the cache line module is further to combine the adjusted instruction in the first cache line with the second instruction and execute the combined adjusted instruction and second instruction.

In Example 21, in the integrated circuit of any of Examples 19-20, the adjusted instruction is directed to a first path of the instruction pipeline comprising one or more staging elements, and wherein the second instruction is injected into a second path of the instruction pipeline that does not comprise the one or more staging elements.

In Example 22, in the integrated circuit of any of Examples 19-21, the creating of the second instruction comprises creating an instruction with a length based on the portion of the address included in the second cache line.

In Example 23, in the integrated circuit of any of Examples 19-22, the second instruction is injected into the second path of the instruction pipeline based on a number of the one or more staging elements.

Various embodiments may have different combinations of the operational features described above. For instance, all optional features of the method described above may also be implemented with respect to a non-transitory computer-readable storage medium. Specifics in the examples may be used anywhere in one or more embodiments.

Example 24 is a non-transitory computer-readable storage medium including instructions that, when executed by a processor, cause the processor to perform the method of Examples 10-18.

Example 25 is a system on a chip (SOC) that comprises a plurality of functional units and a cache line module, coupled to the functional units, to identify an instruction in a first cache line, determine an address associated with the instruction, determine that the address associated with the instruction crosses a cache line boundary associated with the first cache line and a second cache line, in response to determining that the address crosses the cache line boundary, adjust the instruction based on a portion of the address included in the first cache line and create a second instruction based on a portion of the address included in the second cache line, and inject the second instruction into an instruction pipeline after the adjusted instruction.

In Example 26, the SOC of Example 25 further comprises the subject matter of Examples 1-9.

In Example 27, in the SOC of Example 25, the cache line module is further operable to perform the subject matter of Examples 10-18.

In Example 28, the SOC of Example 25 further comprises subject matter of Examples 19-23.

Example 29 is an apparatus comprising means for identifying an instruction in a first cache line, means for determining an address associated with the instruction, means for determining that the address associated with the instruction crosses a cache line boundary associated with the first cache line and a second cache line, means for adjusting the instruction based on a portion of the address included in the first cache line and create a second instruction based on a portion of the address included in the second cache line in response to determining that the address crosses the cache line boundary, and means for injecting the second instruction into an instruction pipeline after the adjusted instruction.

In Example 30, the apparatus of Example 29 further comprises the subject matter of any of Examples 1-9 and 20-23.

Example 31 is an apparatus comprising a cache line module, wherein the cache line module is configured to perform the method of any of Examples 10-18.

In Example 32, the apparatus of Example 31 further comprises the subject matter of any of Examples 1-9 and 19-28.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to cache memory data compression and decompression in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, and 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a memory;
   one or more functional units coupled to the memory; and
   a cache line module coupled to the memory and the one or more functional units and to:
   identify an instruction in a first cache line;
   determine an address associated with the instruction;
   determine that the address associated with the instruction crosses a cache line boundary associated with the first cache line and a second cache line;
   in response to determining that the address crosses the cache line boundary, adjust the instruction based on a portion of the address included in the first cache line and create a second instruction that includes an operation of the adjusted instruction, wherein the operation included in the second instruction is to be performed on a portion of the address included in the second cache line and is not to be performed on another portion of the address included in the first cache line, wherein the adjusting of the instruction based on the portion of the address included in the first cache line comprises reducing a length of the instruction in the first cache line to a length of the portion of the address included in the first cache line, the adjusted instruction being included in a first path associated with an instruction pipeline, wherein the first path includes one or more staging elements, and wherein the second instruction is associated with a status indicator to indicate that the address crosses the cache line boundary;
   inject the second instruction into a second path of the instruction pipeline based on a number of cycles that corresponds to a number of the one or more staging elements included in the first path associated with the instruction pipeline; and
   combine the adjusted instruction included in the first path with the second instruction included in the second path based on the status indicator.

2. The processor of claim 1, wherein the cache line module is further to:
   execute the combined adjusted instruction and second instruction.

3. The processor of claim 1, wherein the adjusted instruction is directed to the first path of the instruction pipeline comprising the one or more staging elements, and wherein the second instruction is injected into the second path of the instruction pipeline that does not comprise the one or more staging elements.

4. The processor of claim 3, wherein the one or more staging elements comprise flip-flops.

5. The processor of claim 1, wherein the injecting of the second instruction into the second path of the instruction pipeline comprises injecting the second instruction after the number of cycles that correspond to the number of the one or more staging elements.

6. The processor of claim 1, wherein the creating of the second instruction comprises creating an instruction with a length based on the portion of the address included in the second cache line.

7. The processor of claim 1, wherein the determining that the address associated with the instruction crosses the cache line boundary associated with the first cache line and the second cache line comprises identifying that a portion of the address is in the first cache line and another portion of the address is in the second cache line.

8. A method comprising:
   determining, by a cache line module of a processor, that an address associated with an instruction crosses a cache line boundary associated with a first cache line and a second cache line;
   in response to determining that the address crosses the cache line boundary, adjusting, by the cache line module, the instruction based on a portion of the address included in the first cache line and creating a second instruction that includes an operation of the adjusted instruction, wherein the operation included in the second instruction is to be performed on a portion of the address included in the second cache line and is not to be performed on another portion of the address included in the first cache line, wherein the adjusting of the instruction based on the portion of the address included in the first cache line corresponds to reducing a length of the instruction in the first cache line to a length of the portion of the address included in the first cache line, the adjusted instruction being included in a first path associated with an instruction pipeline, wherein the first path includes one or more staging elements, and wherein the second instruction is associated with a status indicator to indicate that the address crosses the cache line boundary;
   injecting, by the cache line module, the second instruction into a second path of the instruction pipeline based on a number of cycles that corresponds to a number of the one or more staging elements included in the first path associated with the instruction pipeline; and
   combining the adjusted instruction included in the first path with the second instruction included in the second path based on the status indicator.

9. The method of claim 8, wherein the method further comprises:
   executing, by the cache line module, the combined adjusted instruction and second instruction.

10. The method of claim 8, wherein the adjusted instruction is directed to the first path of the instruction pipeline comprising the one or more staging elements, and wherein the second instruction is injected into the second path of the instruction pipeline that does not comprise the one or more staging elements.

11. The method of claim 10, wherein the one or more staging elements comprise flip-flops.

12. The method of claim 8, wherein the injecting of the second instruction into the second path of the instruction pipeline comprises injecting the second instruction after the number of cycles that correspond to the number of the one or more staging elements.

13. The method of claim 8, wherein the creating of the second instruction comprises creating an instruction with a length based on the portion of the address included in the second cache line.

14. The method of claim 8, wherein the determining that the address associated with the instruction crosses the cache line boundary associated with the first cache line and the second cache line comprises identifying that a portion of the address is in the first cache line and another portion of the address is in the second cache line.

15. An integrated circuit comprising:
    a processor core; and
    a cache line module associated with the processor core and to:
    identify an address associated with an instruction in a first cache line;

determine that the address associated with the instruction crosses a cache line boundary between the first cache line and a second cache line;

in response to determining that the address crosses the cache line boundary, adjust the instruction based on a portion of the address included in the first cache line and create a second instruction that includes an operation of the adjusted instruction, wherein the operation included in the second instruction is to be performed on a portion of the address included in the second cache line and is not to be performed on another portion of the address included in the first cache line, wherein the adjusting of the instruction based on the portion of the address included in the first cache line corresponds to reducing a length of the instruction in the first cache line to a length of the portion of the address included in the first cache line, the adjusted instruction being included in a first path associated with an instruction pipeline, wherein the first path includes one or more staging elements, and wherein the second instruction is associated with a status indicator to indicate that the address crosses the cache line boundary;

inject the second instruction into a second path of the instruction pipeline based on a number of cycles that corresponds to a number of the one or more staging elements included in the first path associated with the instruction pipeline; and combine the adjusted instruction included in the first path with the second instruction included in the second path based on the status indicator.

16. The integrated circuit of claim 15, wherein the cache line module is further to:

execute the combined adjusted instruction and second instruction.

17. The integrated circuit of claim 15, wherein the adjusted instruction is directed to the first path of the instruction pipeline comprising the one or more staging elements, and wherein the second instruction is injected into the second path of the instruction pipeline that does not comprise the one or more staging elements.

18. The integrated circuit of claim 17, wherein the creating of the second instruction comprises creating an instruction with a length based on the portion of the address included in the second cache line.

* * * * *